(12) United States Patent
Bartoli et al.

(10) Patent No.: US 10,150,610 B2
(45) Date of Patent: Dec. 11, 2018

(54) CAPSULE FOR BEVERAGE

(71) Applicant: Sarong Societa' per Azioni, Reggiolo (IT)

(72) Inventors: Andrea Bartoli, Reggio Emilia (IT); Flavio Traldi, San Prospero (IT); Alberto Bartoli, Quattro Castella (IT)

(73) Assignee: Sarong Societa' per Azioni (IT)

( * ) Notice: Subject to any disclaimer, the term of this patent is extended or adjusted under 35 U.S.C. 154(b) by 0 days.

(21) Appl. No.: 14/371,453

(22) PCT Filed: Jan. 9, 2013

(86) PCT No.: PCT/IB2013/050189
§ 371 (c)(1),
(2) Date: Jul. 10, 2014

(87) PCT Pub. No.: WO2013/105036
PCT Pub. Date: Jul. 18, 2013

(65) Prior Publication Data
US 2015/0001100 A1 Jan. 1, 2015

(30) Foreign Application Priority Data

Jan. 12, 2012 (IT) .............................. MO2012A0006
Feb. 3, 2012 (IT) .............................. MO2012A0025

(51) Int. Cl.
*B65D 85/804* (2006.01)
*A47J 31/40* (2006.01)

(52) U.S. Cl.
CPC ........ *B65D 85/8043* (2013.01); *A47J 31/407* (2013.01)

(58) Field of Classification Search
CPC .. B65D 85/8043; B65D 47/243; B65D 35/38; A47J 31/407; A47J 31/0615;
(Continued)

(56) References Cited

U.S. PATENT DOCUMENTS

| 4,077,551 A | 3/1978 | Manaresi | |
| 7,964,230 B2 * | 6/2011 | Kirschner | B65D 85/8043 426/433 |

(Continued)

FOREIGN PATENT DOCUMENTS

| EP | 2196407 A1 | 6/2010 |
| WO | 2008125256 A1 | 10/2008 |

*Primary Examiner* — Anthony Stashick
*Assistant Examiner* — James M Van Buskirk
(74) *Attorney, Agent, or Firm* — Laubscher & Laubscher, P.C.

(57) ABSTRACT

A capsule includes a deformable and/or compressible casing provided with a base wall and a side wall defining a cavity suitable for containing an initial product to be combined with a fluid to make a final product. The deformable base wall is provided with an outlet passage for the outflow and dispensing of the final product, and when the casing is compressed and/or crushed, it changes from an initial configuration to a final configuration. The capsule further includes a closing device inside the cavity, substantially facing and adjacent to the base wall and provided with a closing portion arranged inside the cavity for engaging and closing the outlet passage in the initial configuration of the base wall, and for disengaging and opening the outlet passage, so as to dispense the final product through the outlet passage in the final configuration of the base wall.

18 Claims, 10 Drawing Sheets

(58) Field of Classification Search
CPC ............... A47J 31/0621; A47J 31/0631; A47J 31/0636; A47J 31/0642; A47J 31/0673; A47J 31/0678; A47J 31/3638; A47J 31/3642; A47J 31/3695; A47J 31/405; A47J 31/4492; A47J 31/467
USPC ............................................ 206/0.5; 99/295
See application file for complete search history.

(56) References Cited

U.S. PATENT DOCUMENTS

| | | | |
|---|---|---|---|
| 2003/0222089 A1* | 12/2003 | Hale ................. | B65D 85/8043 220/574 |
| 2004/0228955 A1* | 11/2004 | Denisart ............ | B65D 85/8043 426/590 |
| 2008/0028946 A1 | 2/2008 | Kirschner et al. | |
| 2010/0092629 A1 | 4/2010 | Keller | |
| 2010/0203208 A1 | 8/2010 | Yoakim et al. | |
| 2010/0326283 A1 | 12/2010 | Evers et al. | |
| 2011/0064852 A1 | 3/2011 | Mann | |

\* cited by examiner

CAPSULE FOR BEVERAGE

This application is a § 371 National Stage Entry of PCT International Application No. PCT/IB2013/050189 filed Jan. 9, 2013. PCT/IB2013/050189 claims priority to IT application No. MO2012A000006, filed Jan. 12, 2012, and IT Application No. MO2012A000025, filed Feb. 3, 2012. The entire content of these applications are incorporated herein by reference.

BACKGROUND OF THE INVENTION

The invention relates to capsules or containers for preparing beverages in automatic dispensing machines, in particular, it relates to a single-dose and disposable sealed capsule containing a percolable or soluble product or an infusion product, capable of making a beverage by interacting with a pressurized fluid, typically water or milk.

Brief Description of the Prior Art

The known capsules for use on known dispensing machines are disposable, single-dose containers including an outer casing formed of liquid- and gas-impermeable plastic material and having the shape of a glass or cup. In particular, the casing has a bottom wall and a side wall defining a cavity provided with an upper opening through which the product from which the beverage can be obtained can be inserted. The upper opening is hermetically sealed by a cover, typically an aluminum or plastic film sheet, in order to seal the product inside the container cavity. The capsule is perforable to allow the introduction of a pressurized liquid, typically water, and the outflow of the obtained beverage. In particular, the cover and the bottom wall of the casing are perforable by a suitable device of the dispensing machine, to allow the introduction of the pressurized liquid from the top and the extraction of the beverage, from the bottom, respectively.

Capsules provided with a filtering element inserted into the outer casing and containing the product from which the beverage can be obtained are also known.

A drawback of the known capsules described above is that they can be used only on dispensing machines provided with a proper dispensing circuit including an extraction device suitable for perforating the bottom of the capsule to allow the outflow of the beverage, and a conduit suitable for conveying the beverage to a container for use (for example, a cup, a small cup, a glass, etc.). Such a dispensing circuit makes the structure of the machine more complex and expensive. Furthermore, since the dispensing circuit is in contact with the dispensed beverages, it should be washed after each dispensing operation, both for hygienic reasons and without compromising the flavor and quality (organoleptic properties) of a beverage that is subsequently dispensed (for example, an aromatic infusion dispensed after a coffee). However, due to their manufacturing complexity and costs a washing device of the dispensing circuit is not always present in the known machines.

The known dispensing machines further include a supply circuit provided with an injection device (typically, needles or pointed nozzles) that perforate the cover and deliver the pressurized liquid coming from a pump and/or a boiler. During the operative step of beverage production, the injection device can contact the product and/or the beverage, thus becoming contaminated. For hygienic reasons, and to not avoid compromising the organoleptic properties of a beverage dispensed during later use, the delivering device of the supply circuit should be suitably washed after each dispensing operation.

Furthermore, capsules for beverages are known, which are provided with a filtering element closing the upper opening of the outer casing and/or a filtering element inserted on the bottom wall of the outer casing. The filtering elements, generally made of plastics, prevent the outflow of the product outside the capsule, but allow the passage of the pressurized liquid and/or the outflow of the beverage.

With filtering elements that close the upper opening, the delivering device does not contact the product or the beverage.

The above-mentioned capsules have the drawback to not hermetically close the product, due to the filtering elements, therefore, due to hygienic and preservation reasons of the product, have to be suitably packaged, for example, in sealed bags, preferably under a controlled atmosphere, with consequent further increase of manufacturing costs.

The known capsules described above allow obtaining beverages by percolation of the liquid through the product (typically, coffee powder) or by solubilization of the product (for example, tea, infusions, etc.).

Documents US 2010/092629, US 2010/326283, US 2008/028946, U.S. Pat. No. 4,077,551, US 2011/064852, US 2010/203208, and WO 2008/125256 are representative of the prior art.

SUMMARY OF THE INVENTION

An object of the present invention is to improve the known disposable and single-dose capsules for beverages containing a percolable or soluble or for infusion initial product, suitable for interacting with a fluid, typically pressurized hot water, for preparing a corresponding final product, typically a beverage, in an automatic dispensing machine.

Another object is to make a capsule that is capable of dispensing a beverage, or another fluid food product, directly into a use container (cup, glass, etc.) without the need to be perforated by means of the dispensing machine.

A further object is to obtain a hermetically closed capsule capable of preserving and insulating in an optimal manner the product contained therein from the environment, without needing a special packaging.

Still another object is to make a capsule that allows dispensing in a controlled and even manner the beverage prepared in the container, in particular at a reduced and limited pressure and outlet speed.

Still a further object is to obtain a capsule that does not contaminate or pollute parts of the dispensing machine with the product and/or the beverage, thereby ensuring both the hygiene and cleanliness of the latter, together with its flavor and quality, i.e., the integrity of the organoleptic properties, of the beverage.

BRIEF DESCEIPTION OF THE FIGURES

The invention will be better understood and implemented with reference to the attached drawings, which illustrate some exemplary, non-limiting embodiments thereof, in which.

DETAILED DESCRIPTION

With reference to the FIGS. 1 to 7, a capsule 1 according to the invention is illustrated, containing an initial product P and usable in a dispensing machine 60 to produce, by injection of a pressurized fluid therein, a final product B, for example, a beverage such as coffee, barley coffee, infusion, tea, chocolate, etc., or a food, such as soup, broth, vegetable purees, and the like.

The capsule 1 of the invention comprises an outer casing 2, or container, substantially glass or cup shaped, provided with a base wall 3 and with a side wall 4, both deformable and defining a cavity 5 open and suitable for containing the initial product P from which the final product B can be obtained.

The casing 2 is compressible and/or deformable and made by forming a sheet of thermoformable material, in particular a liquid- and gas-impermeable multilayered plastic material and suitable for contacting food.

To allow the casing 2 to be compressed and crushed along a direction A almost parallel to a longitudinal and symmetry axis X of the capsule 1 and substantially orthogonal to the base wall 3, the side wall 4 is deformable and/or compressible along preset pliability lines 17, for example, having a helicoidal trend.

Alternatively, the side wall 4 can be made in the shape of an accordion or of a bellows.

Furthermore, the side wall 4 is divergent starting from the base wall 3 to a peripheral edge 7, for example almost frusto-conical shaped.

The base wall 3 is provided with an outlet passage 8, for example an opening or hole, for the outflow and dispensing of the final product B directly into a use container. The base wall 3 is further deformable, and it can arrange, or be configured or deformed or bend, from an initial configuration D1, to a non-deformed casing 2, to a final configuration D2 when the casing 2 is compressed and/or crushed. More precisely, the base wall 3, when the casing 2 is compressed and/or crushed to allow the outflow of the final product B, from the initial configuration D1 in which it is folded or curved towards the inside of the cavity 5, in particular so as to form a substantially convex wall, acquires the, or arranges into the, final configuration D2, in which it is folded or curved towards the outside of the cavity 5, in particular so as to form a substantially concave wall.

Furthermore, the casing 2 comprises a connecting wall 6 that is interposed between the base wall 3 and the side wall 4.

Figure 1:
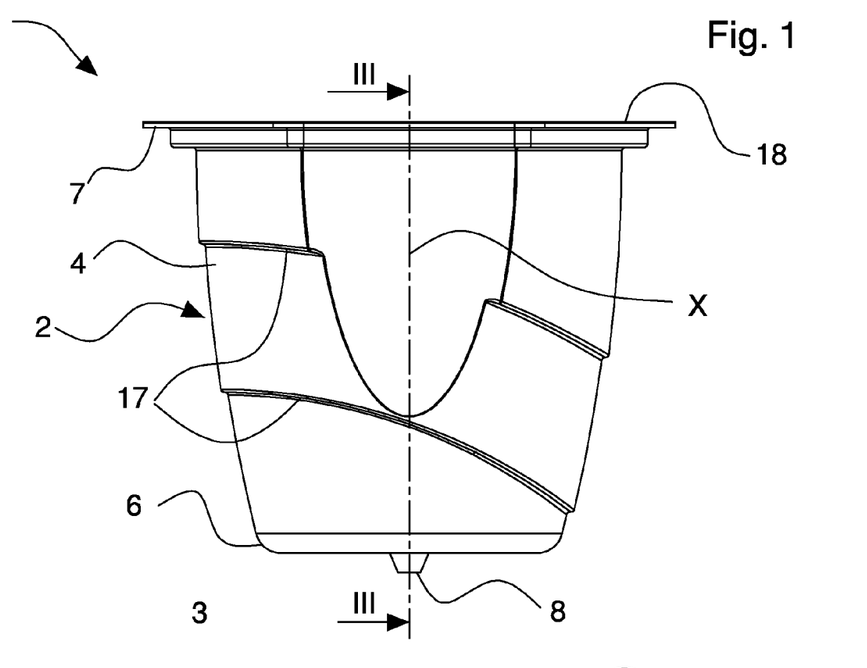
FIG. 1 is a front view of the capsule according to the invention.
Figure 2:
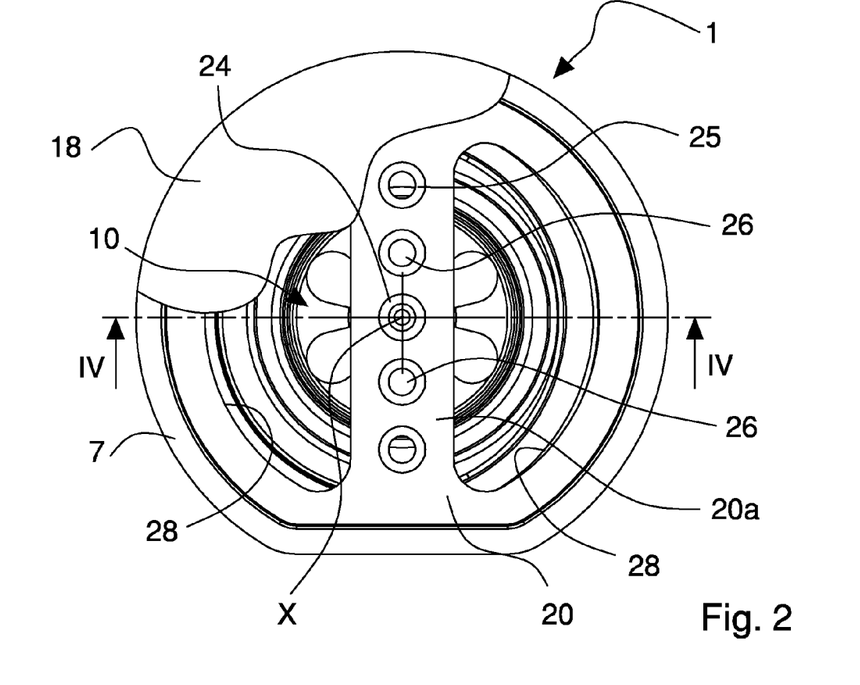
FIG. 2 is a plan view from the top of the capsule in FIG. 1.
Figure 3:
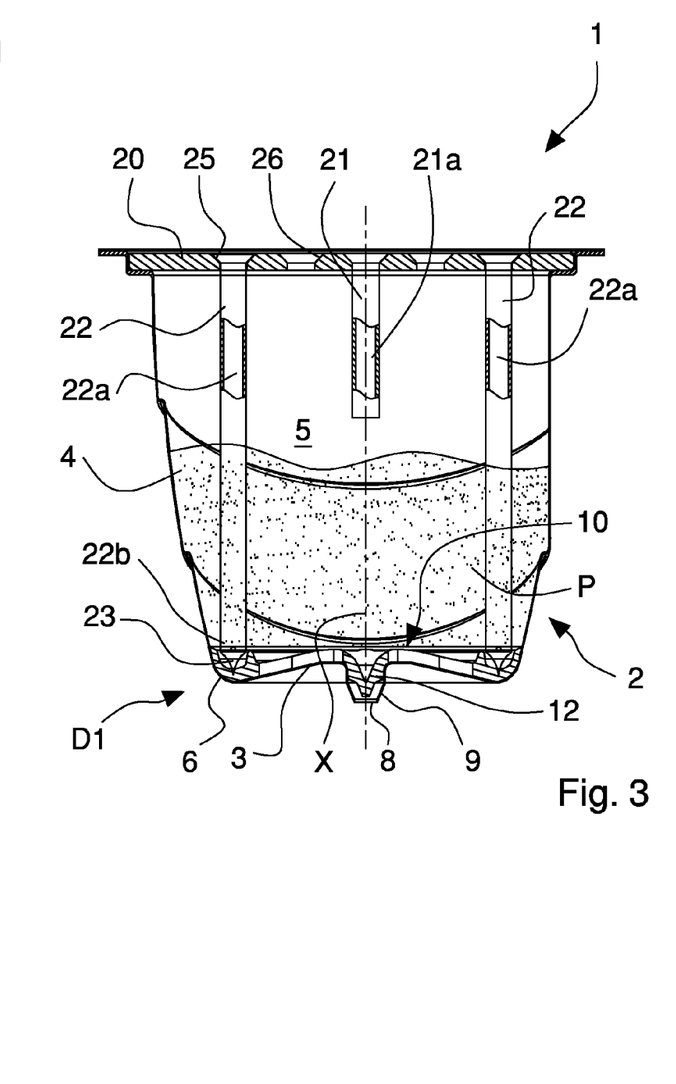
FIG. 3 is a cross-section according to the line in FIG. 1.
Figure 4:
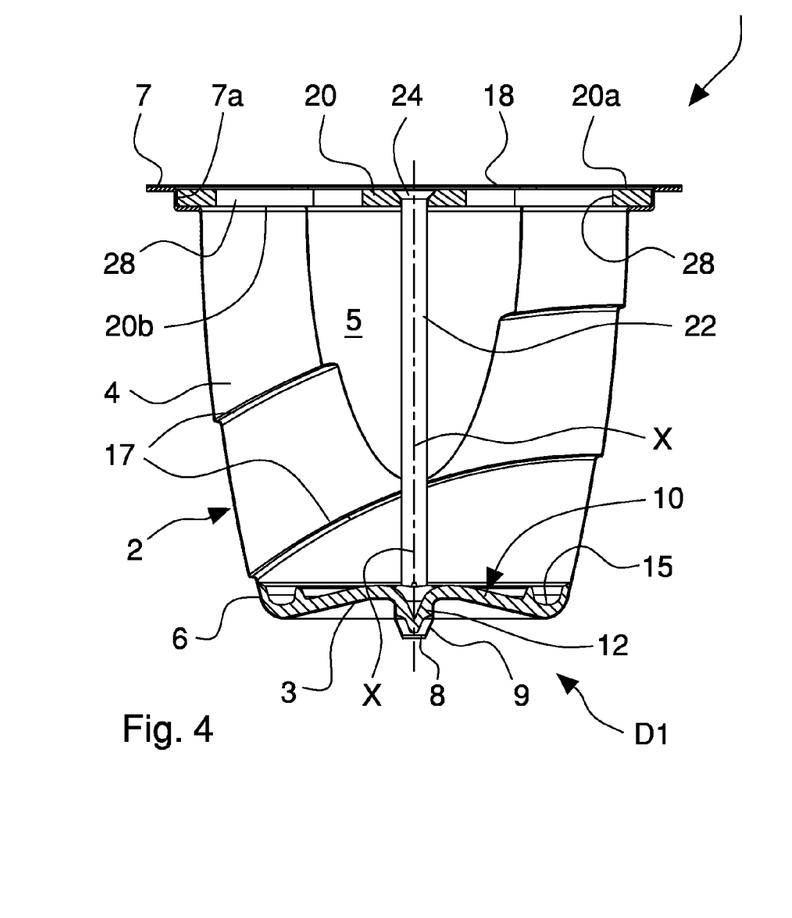
FIG. 4 is a cross-section according to the line IV-IV in FIG. 2.
Figure 5:
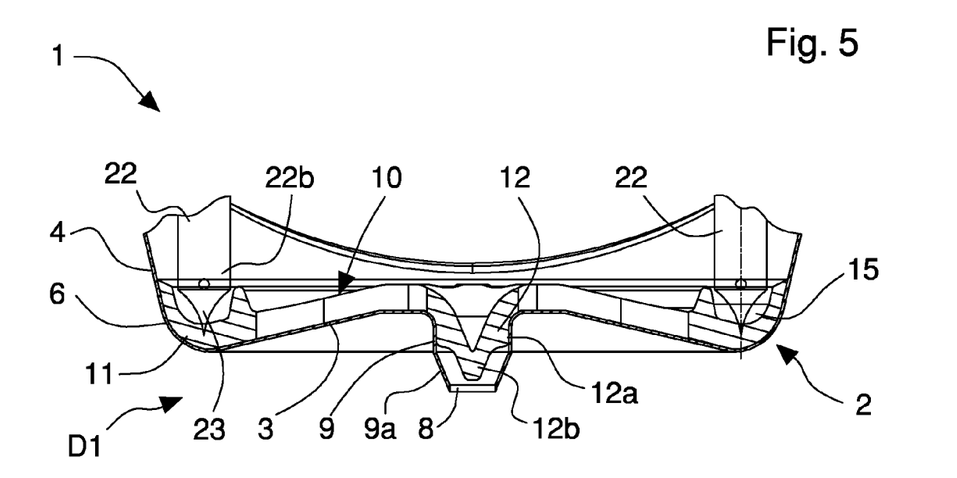
FIG. 5 is an enlarged view of the cross-section in FIG. 3 illustrating a closing device including a closing element associated with a base wall of a casing of the capsule, the base wall being arranged in an initial configuration.
Figure 6:
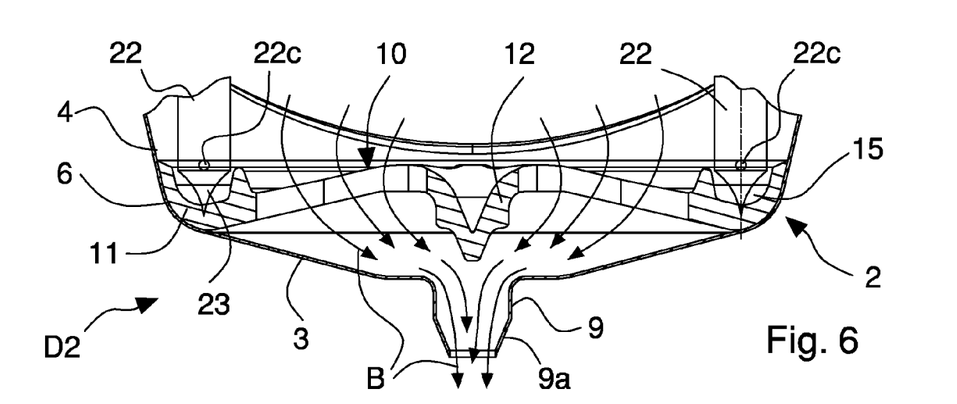
FIG. 6 is a view as that in FIG. 6, illustrating the closing element and the base wall, the latter being in a final configuration for dispensing a final product.
Figure 7:
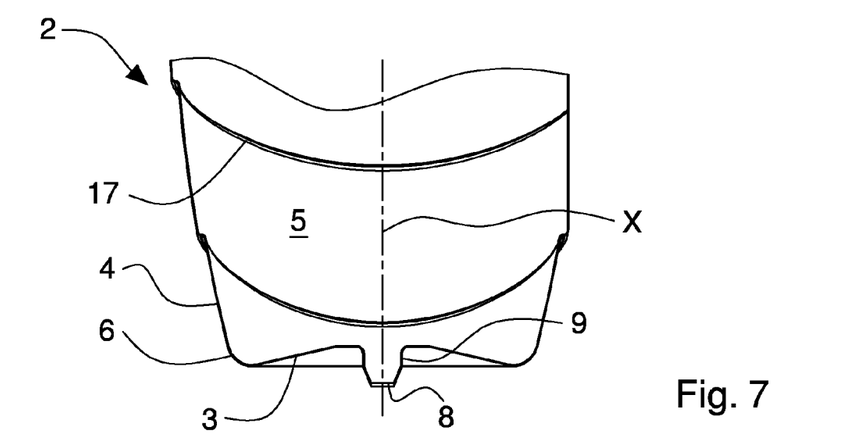
FIG. 7 is an enlarged, partial cross-section of the casing of the capsule in FIG. 1.

The capsule 1 is provided with a closing device 10 associated with an inner surface of the base wall 3 and selectively arranged for closing the outlet passage 8 when the base wall 3 is in the initial configuration D1 or for disengaging and opening the outlet passage 8 when, following the crushing of the casing 2, the base wall 3 acquires the final configuration D2, thus allowing the outflow and dispensing of the final product B. More precisely, the closing device 10 is provided with a closing portion 12 arranged for engaging and closing the outlet passage 8 in the initial configuration D1 of the base wall 3, and for disengaging and opening the outlet passage 8 and to allow the outflow and dispensing of the final product B in the final configuration D2 of the base wall 3.

The outlet passage 8 is in particular made in a dispensing conduit 9 of the base wall 3. The dispensing conduit 9 is provided with a substantially convergent terminal portion 9a, in particular frusto-conical shaped. The dispensing conduit 9 and the outlet passage 8 are arranged centrally on the base wall 3, substantially aligned with the longitudinal symmetry axis X of the capsule 1.

In the illustrated embodiment the closing, device includes a closing element 10 facing and adjacent to the base wall 3.

Figure 8:
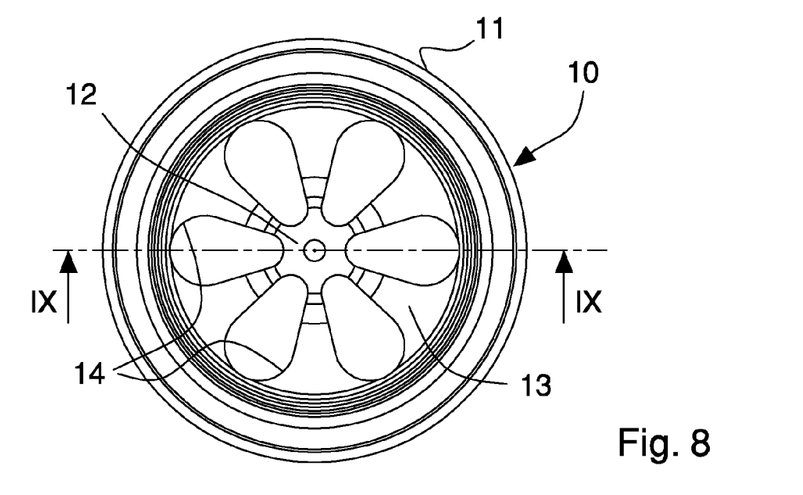
FIG. 8 is a plan view from the top of the closing element.
Figure 9:
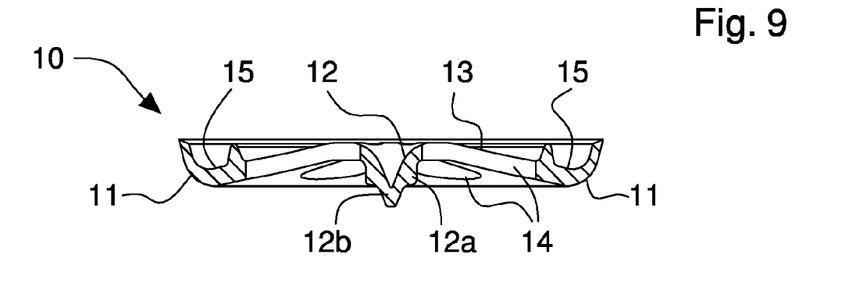
FIG. 9 is a cross-section according to the line IX-IX in FIG. 8.

The closing element 10 is, for example, a substantially flat disc-shaped element made of elastomeric or plastic material. The closing element 10 comprises a peripheral lateral portion 11 that is suitable for abutting on, in particular with interference, the side wall 4 and/or the connecting wall 6 of the casing 2, the closing portion 12 being suitable for engaging and closing the outlet passage 8, i.e., to be hermetically inserted in the latter and/or in the dispensing conduit 9, and a central portion 13 shaped so as to abut on the base wall 3, when the latter is in the initial configuration D1. The central portion 13 connects the closing portion 12 to the lateral portion 11.

In the illustrated embodiment, the closing element 10 has a plan shape that is almost circular, and the central portion 13 comprises at least one through opening 14 for the passage of the final product B. More precisely, the central portion 13 is provided with a plurality of through openings or holes 14, for example in a number of six and in the shape of a lobe, mutually arranged angularly spaced apart, for example by the same angle. The through openings 14, besides allowing the flow of the final product B during a dispensing step, as better explained in the following of the description, allow the central portion 13 to abut on and adhering better and more efficiently to the base wall 3, when the latter is in the initial configuration D1.

The closing portion 12 of the closing element 10 comprises, starting from the central portion 13, a first tapered portion 12a, in particular having a first taper, which is intended to close the outlet passage 8, and a second tapered portion 12b, in particular having a second taper, arranged for conveying outward the final product B in cooperation with the outlet passage 8. More precisely, the first length 12a internally abuts on and obstructs the dispensing conduit 9 and then the outlet passage 8.

A cover element 18 is fixed to the edge 7 of the casing 2 to hermetically close the cavity 5. To allow the delivery of the fluid F into the cavity 5, the cover element 18 is perforable, in particular by an injection device 61 of the dispensing machine 60 (FIG. 10), The cover element 18 includes, for example, an aluminum or plastic material sheet.

The capsule 1 further includes a supporting element 20 fixed to the edge 7 of the casing 2 and facing the cavity 5, and to which at least one nozzle 21 arranged for delivering the fluid F into the cavity 5 is fixed.

In particular, the first edge 7 forms an annular seat 7a receiving a peripheral edge of the supporting element 20 that can be fixed thereto by welding or gluing or by interference fit.

The capsule 1 is further provided with one or more further nozzles 22, for example in a number of two, substantially mutually identical, also fixed to the supporting element 20 and arranged so as to deliver the fluid F into the cavity 5.

The further nozzles 22 are arranged substantially parallel to the nozzle 21 and flanking the opposite sides of the latter so as to approach with respective end portions 22b to the side wall 4.

As shown in the FIGS., the further nozzles 22 have a length greater than the nozzle 21 so that the respective end portions 22b are inserted into the initial product P and substantially in contact with the closing element 10. The latter includes a seat or recess 15 that is arranged for receiving and locking an end portion 22b of the further nozzles 22. In this regard, the end portions 22b are provided with elastic inserts 23 suitable for abutting on the above-mentioned seat 15. The latter includes a peripheral annular notch or recess 15 obtained on the central portion 13 of the closing element 10, substantially at the lateral wall 11.

The further nozzles 22 are so shaped as to direct respective jets of fluid F towards the side wall 4, in particular with a substantially tangential direction, so as to create a vortical flow, or whirl, of fluid F and product P, progressively mixed, which, from the base wall 3, rises to the supporting element 20. To this aim, each further nozzle 22 comprises at the respective end portion 22b at least one injection opening 22c having, for example, the shape of a circular hole.

On the other hand, the nozzle 21 is configured to direct at least one jet of fluid F downwardly, i.e., to the direction of the base wall 3 and substantially at the center of the vortical flow in order to repel towards, and to maintain the still dry initial product P on the base wall 3.

The pressure and flow rate of the fluid dispensed by the nozzle 21 can be different, in particular higher than the pressure and the flow rate of the fluid dispensed by the further nozzles 22. The combination of the jets of fluid F dispensed by the nozzle 21 and the further nozzles 22 allows entirely and evenly solubilizing and dissolving, without the manual intervention by a user, initial products that are slightly or slowly soluble and/or containing thickening agents and stabilizing agents, thus obtaining dense or viscous final products (for example, chocolates or soups) that are perfectly dissolved and free from clots and lumps. To this aim, the pressure and temperature of the injected fluid have be suitably adjusted according to the type and the composition of the product.

To enable the capsule 1 to be compressed and/or crushed, the further nozzles 22 are deformable and/or compressible. To this aim, each further nozzle 22 can comprise, for example, a corrugated or bellows-shaped tubular wall that can be easily compressed and/or folded and deformed.

The supporting element 20 comprises a body which is substantially flat shaped, for example a disc, and provided with one or more respective openings 28, for example two openings, to insert the initial product P into the cavity 5 of the capsule 1 in a filling step of the latter.

The nozzle 21 is fixed to an internal face 20b of the supporting element 20, while on an opposite external face 20a of the latter, there is provided a supplying hole 24 in flow communication with an internal conduit 21a of said nozzle 21.

Similarly, the further nozzles 22 are fixed to the internal face 20b, respective further supplying holes 25 being provided on the opposite external face 20a, which are in flow communication with further internal conduits 22a of the respective further nozzles 22.

One or more breather holes 26, for example two breather holes, are provided on the supporting element 20 to enable the necessary outflow of air or inert gas contained therein during filling and crushing steps of the capsule 1.

The supporting element 20 and the nozzles 21, 22 can be made in a single piece, for example by an injection molding process of a plastic material.

The supplying holes 24, 25 of the supporting element 20 are arranged for engaging with the injection device 61 of the dispensing machine 60 including, for example, a plurality of needles 71 or similar elements that are arranged for perforating the cover element 18 and inserting into and hermetically abutting on the respective supplying holes 24, 25, thus delivering the fluid F into the cavity 5 through the nozzles 21, 22. To enable the outflow of air from the capsule 1, the injection device also includes further needles 72 or similar elements that are arranged for perforating the cover element 18 and inserting into and hermetically abutting on the breather hole 26 of the supporting element 6 so as.

In this manner, the injection device of the dispensing machine does not contact the initial product P and/or the mixture/beverage being prepared and dispensed, thus ensuring the hygiene of the dispensing process and the quality of the beverages at each dispensing operation, in order to preserve the organoleptic properties thereof.

Furthermore, the capsule 1 for beverages of the invention can be used on a dispensing machine 60 that is not provided with a dispensing circuit, since such a capsule does not need an extraction device suitable for perforating the bottom thereof to enable the outflow of the beverage, nor a conduit for conveying the beverage to the container used for the beverage (for example a cup, a small cup, a glass, etc.).

The absence of a dispensing circuit makes the machine more simple and inexpensive, besides ensuring the hygiene of the dispensing process and the maintenance of the quality of the dispensed beverages, since contaminations between beverages dispensed at later moments are not possible.

The operation or use of the capsule 1 of the invention—which can be used in a dispensing machine 60 of the type illustrated in FIG. 10 and briefly described herein below—provides, in an initial step, the introduction through the nozzle 21 and the further nozzles 22 of the fluid F into the cavity 5, so that it can interact with the initial product P to gradually form the final product B, typically a beverage or a food in fluid form. In this step, the base wall 3 is arranged or configured in the initial configuration D1, and the closing element 10 adheres thereto, and in particular, its closing portion 12 engages the dispensing conduit 9 and hermetically closes the outlet passage 8 preventing the outflow of the initial product P and/or the final product B.

Once the final product B has been obtained, after a preset time and/or a preset quantity of introduced fluid F, the capsule 1 can be progressively compressed and crushed along the direction A. The side wall 4 collapses along the pliability lines 17, while the base wall 3, also due to the pressure increase inside the cavity 5, deforms and bends towards the outside, i.e., everts, in the final configuration D2 in which it acquires a concave shape, so as to enable the opening of the outlet passage 8.

As illustrated in detail in FIG. 6, in such a final configuration D2 of the base wall 3, the closing portion 12 of the closing element 10 does not engages the outlet passage 8 and/or the dispensing conduit 9, thus enabling the outflow of the final product B.

It shall be worth noting that in this step the second conical shaped portion 12*b* of the closing portion 12 directs and conveys the product flow towards the convergent and conical terminal portion 9*a* of the dispensing conduit 9. In such a manner, a regular outlet flow from the capsule is ensured, which is free from spurts, splashes, and gushes.

The gradual and progressive outflow of the final product B from the capsule 1 (therefore, without spurts, splashes, and gushes) is also ensured by the gradual opening of the outlet passage 8, since the base wall 3 does not pass from the initial configuration to the final configuration D2 in a sudden or abrupt manner, but in a gradual manner as the pressure inside the cavity 5 rises, and/or as the deformation of the side wall 4 increases.

An advantage of the capsule 1 that is the subject of the present invention is to dispense a final product, for example a beverage or another fluid food product, directly into a use container (cup, glass, etc.) without the need to be perforated below. In fact, the controlled deformation of the base wall 3, from the initial configuration D1 to the final configuration D2, and the presence of the closing element 10 enable the automatic and gradual opening of the outlet passage 8 during the compression or crushing of the capsule 1.

Another advantage of the capsule 1 is to allow dispensing in a controlled and even manner the final product prepared in the container, in particular with reduced and limited pressure and outlet speed. The gradual deformation of the base wall 3 and then the progressive opening of the outlet passage 8, together with the conical shape of the closing portion 12 and the dispensing conduit 9. in fact ensure an even outlet flow, which is free from spurts, splashes, and gushes.

Figure 10:
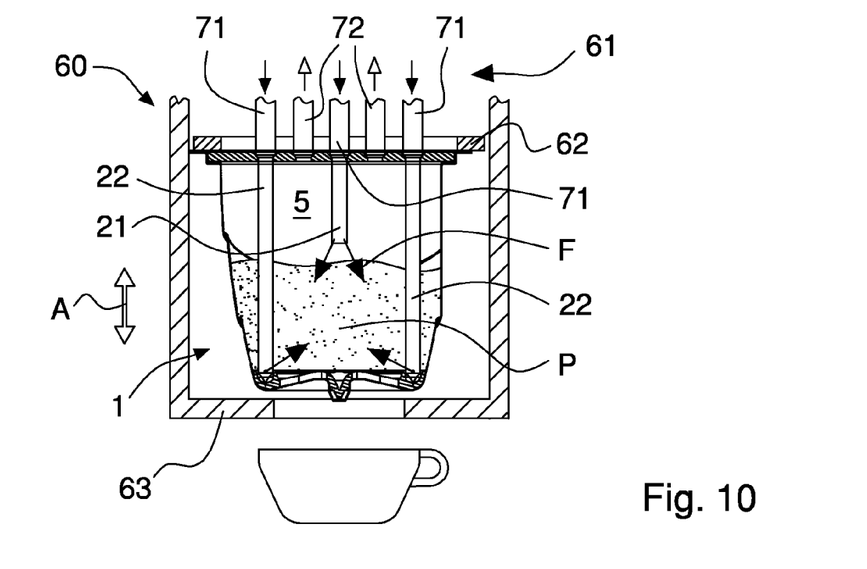
FIG. 10 is a cross-sectional view of the capsule in FIG. 1 associated with a dispensing machine.
Figure 11:
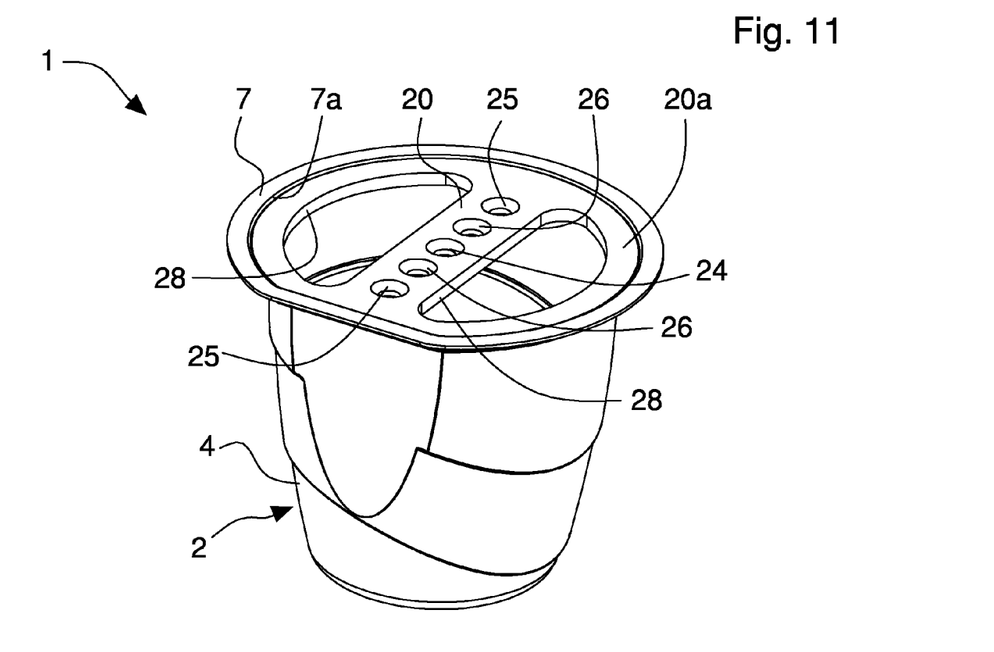
FIG. 11 is a perspective view from the top of the capsule in FIG. 1 devoid of an upper cover element.
Figure 12:
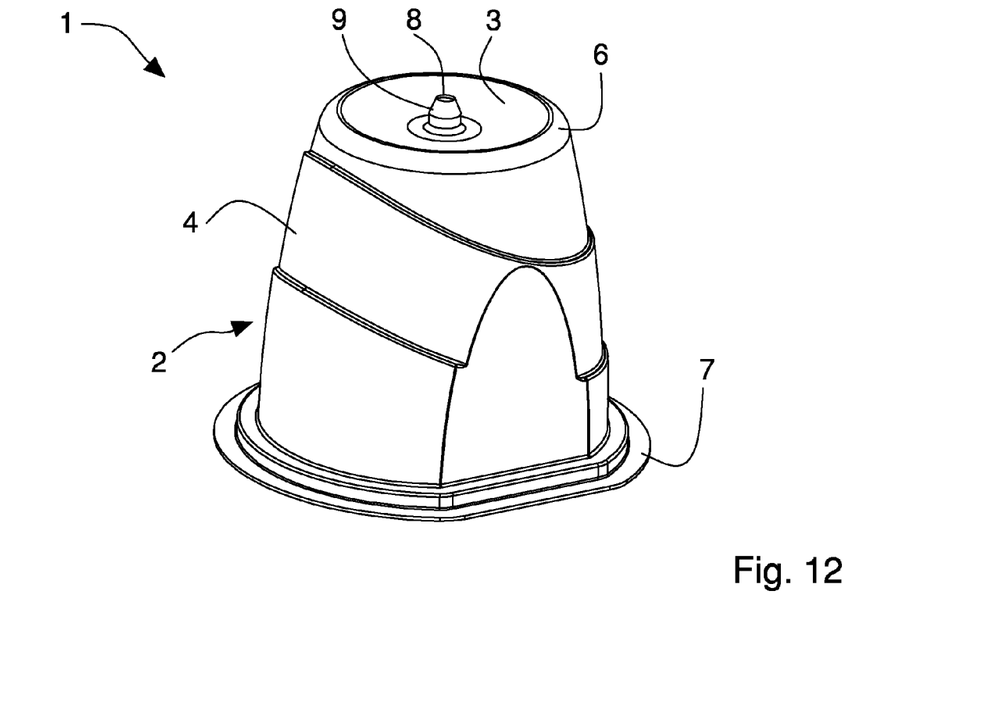
FIG. 12 is a perspective view from the bottom of the capsule in FIG. 1.
Figure 13:
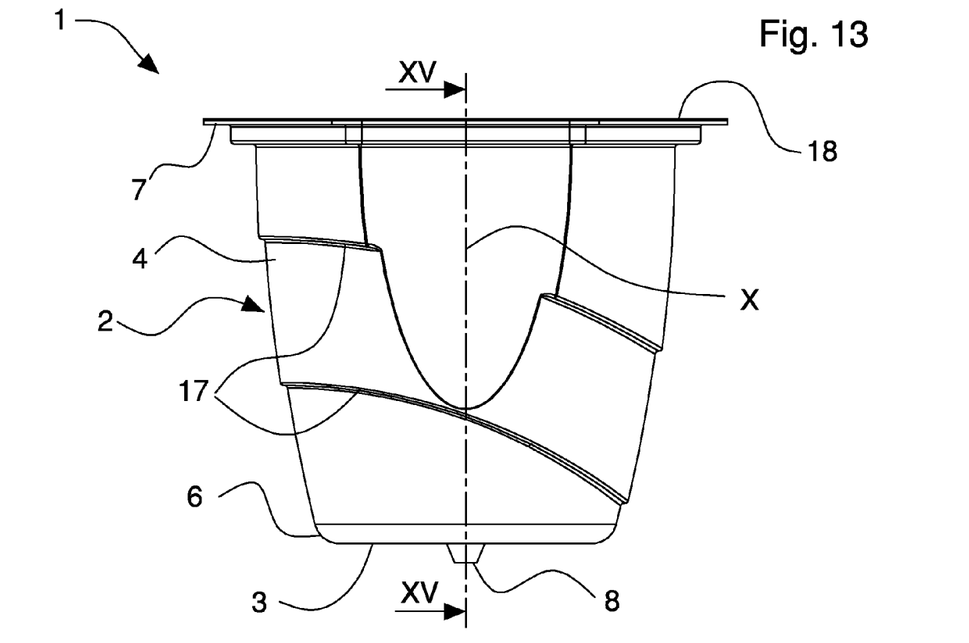
FIG. 13 is a front view of another version of the capsule according to the invention.
Figure 14:
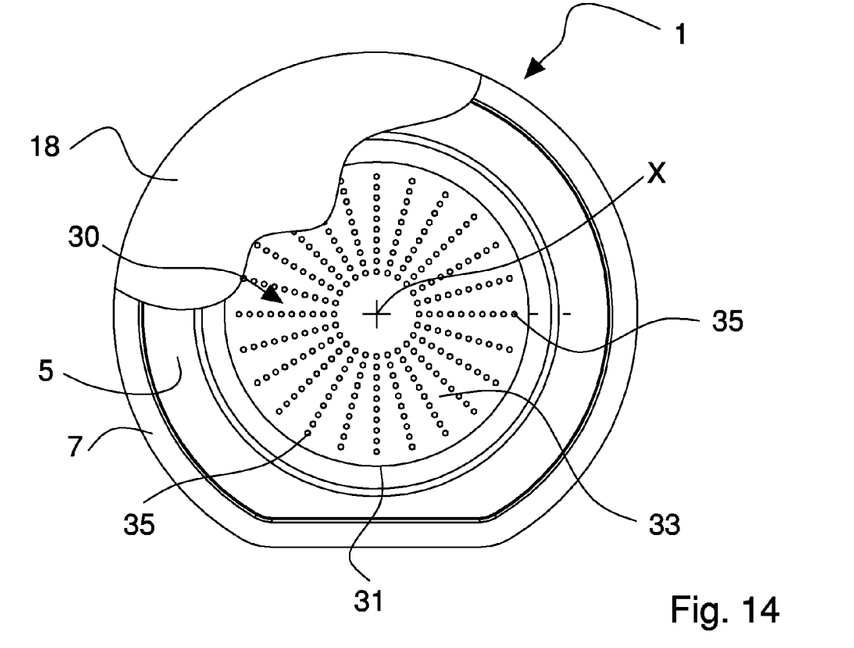
FIG. 14 is a plan view from the top of the capsule in FIG. 13 with a partially illustrated cover element.

With particular reference to FIG. 10, the dispensing machine 60 for the capsule that is the subject of the present invention and described above further includes a positioning device 63 for receiving and containing the capsule 1. The positioning device 63 is movable in both directions along the direction A, substantially vertical and orthogonal to the base wall 3.

The positioning device 63 in an initial operative position can receive differently sized capsules.

From the initial position, the positioning device 63 is movable to an intermediate operative position wherein the upper part of the capsule 1 provided with the cover element 18 abuts on an abutting element 62 and on the injection device 61 of the dispensing machine 60.

From the intermediate operative position, the positioning device is further movable along the direction A, to a final operative position for progressively compressing and crushing the capsule 1 against the abutting element 62 and to allow the opening thereof and the outflow of the beverage.

The abutting element 62 includes an annular plate acting on the edge 7 of the casing 2 and on a peripheral portion of the supporting element 6. The plate is fixed to a frame of the dispensing machine or to the injection device 61.

With reference to the FIGS. 13 to 18, another version of the capsule 1 according to the invention is illustrated, containing an initial product P and being usable in a dispensing machine 60 for producing, by injecting a pressurized fluid therein, a final product B, for example a beverage, such as coffee, barley coffee, tea, etc.

The capsule 1 of the invention comprises an outer casing 2, or container, substantially glass or cup shaped, provided with a base wall 3 and with a side wall 4, both of which are deformable and defining a cavity 5 that is open and suitable for containing the initial product P from which the final product B is obtained.

The casing 2 is compressible and/or deformable and/or crushable, and manufactured by forming a sheet of thermoformable material, in particular a multilayered plastic material liquid- and gas-impermeable and suitable for food contact.

To allow the casing 2 to be compressed and crushed along a direction A almost parallel to a longitudinal axis X of the capsule 1 and substantially orthogonal to the base wall 3, the side wall 4 is deformable and/or compressible along preset pliability lines 17, for example having a helical trend.

Alternatively, the side wall 4 can be made in the shape of an accordion, or in the shape of a bellows.

Furthermore, the side wall 4 is divergent starting from the base wall 3 to a peripheral edge 7, for example with an almost frusto-conical shape.

The base wall 3 is provided with an outlet passage 8, for example, an opening or hole, for dispensing the final product B directly into a use container. The base wall 3 is further deformable and it may be arranged, or be configured, or deformed or bend, from an initial configuration D1 to a final configuration D2 when the casing 2 is compressed and/or crushed and/or when a pressure rises inside the cavity 5.

Figure 16:
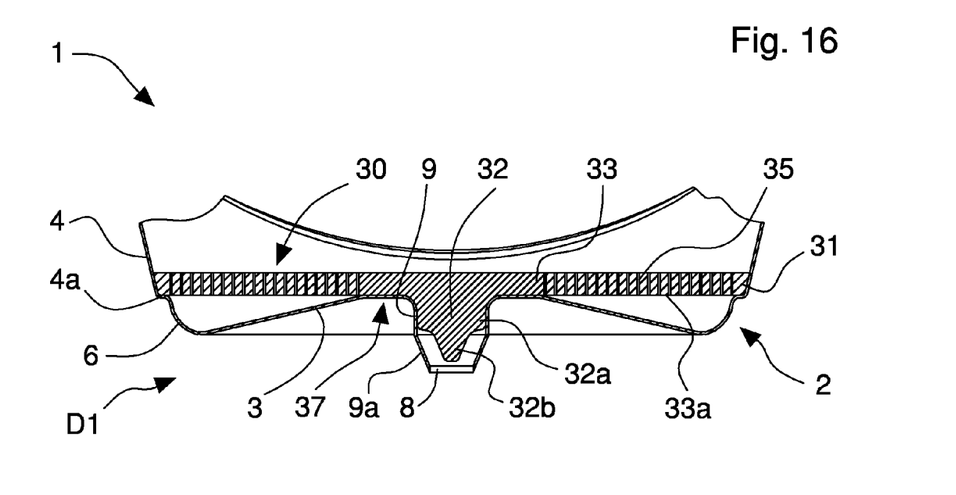
FIG. 16 is an enlarged view of the cross-section in FIG. 15 illustrating a closing device including a filtering element associated with a base wall of a casing of the capsule, the base wall being arranged in an initial configuration.
Figure 17:
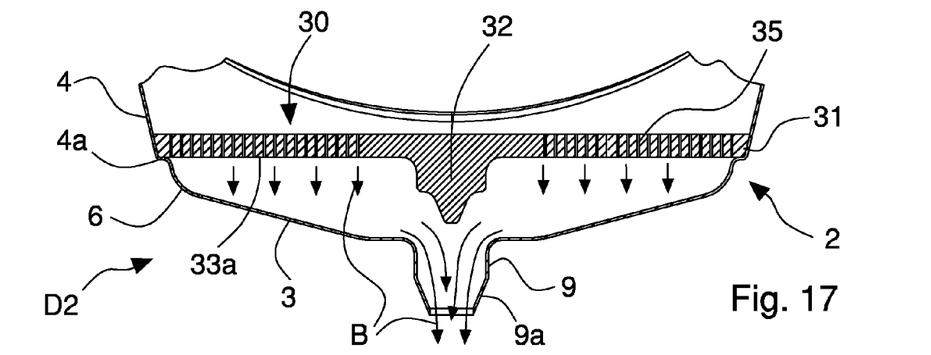
FIG. 17 is a view as that in FIG. 16, illustrating the filtering element and the base wall, the latter being in a final configuration for dispensing a final product.
Figure 18:
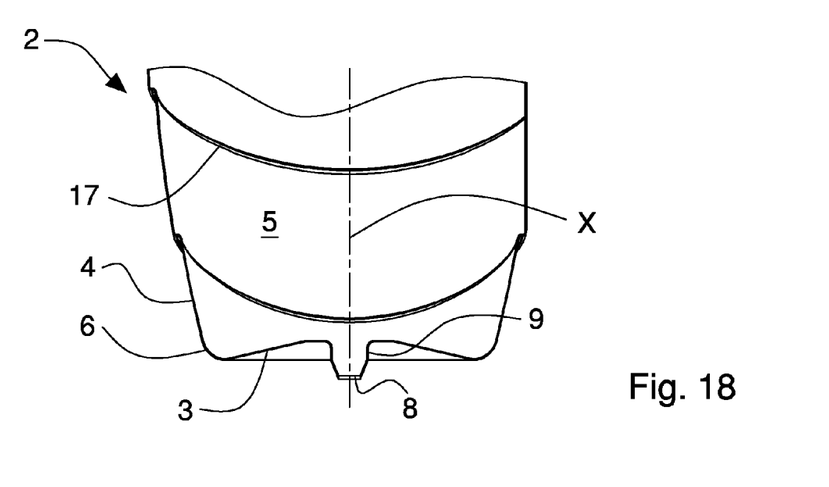
FIG. 18 is an enlarged, partial cross-section of the casing of the capsule in FIG. 13.

More precisely, the base wall 3, when the casing 2 is compressed and/or crushed to allow the outflow of the final product B, from the initial configuration D1 in which it is folded or curved toward the inside of the cavity 5, in particular so as to form a substantially convex wall, acquires the, or arranges in the, final configuration D2, in which it is folded or curved toward the outside of the cavity 5, in particular so as to form a substantially concave wall. The casing 2 further comprises a connecting wall 6 that is interposed between the base wall 3 and the side wall 4.

The capsule 1 is provided with a closing device 30 associated with an inner surface of the base wall 3 and selectively arranged for engaging and closing the outlet passage 8 when the base wall 3 is in the initial configuration D1, or for disengaging and opening the outlet passage 8 when, following crushing of the casing 2, the base wall 3 acquires the final configuration D2, thus allowing dispensing of the final product B.

The closing device includes a filtering element 30 arranged inside the cavity 5, facing and adjacent to an inner surface of the base wall 3 and interposed between the latter and the initial product P. The filtering element 30 defines a chamber inside the cavity 5, suitable for containing the initial product P.

The filtering element 30 comprises a closing portion 32 arranged for selectively engaging and closing the outlet passage 8 when the base wall 3 is in the initial configuration D1 or for disengaging and opening the outlet passage 8 when, following the compression and crushing of the casing 2, the base wall 3 acquires the final configuration D2, thus allow the dispensing of the final product B.

In particular, the outlet passage 8 is made in a dispensing conduit 9 of the base wall 3. The dispensing conduit is provided with an terminal portion 9a substantially convergent, in particular frusto-conical shaped. The dispensing conduit 9 and the outlet passage 8 are centrally arranged on the base wall 3, substantially aligned with the longitudinal axis X of the capsule 1.

The filtering element 30 is a substantially flat disc-shaped element, which is made of a plastic material, for example by injection molding. The filtering element 30 comprises a peripheral side portion 31 suitable for abutting on, in particular with interference, the side wall 4 and/or the connecting wall 6 of the casing 2, and a central portion 33 provided with a plurality of passages or conduits 35 enabling the passage and thus the outflow from the capsule of the final product B, while preventing the outflow of the initial product P.

The side portion 31 is fixed, in particular welded or glued, to the side wall 4 and/or the connecting wall 6.

In the illustrated embodiment, the filtering element 30 is in the shape of an almost circular disc, and the side wall 4 has a peripheral projection 4a suitable for abutting on and supporting the above-mentioned filtering element 30 along the entire side portion 31 thereof.

The closing portion 32 extends from an external face 33a of the central portion 33, said external face 33a facing the base wall 3. The closing portion 32 comprises, starting from the central portion 33, a first tapered portion 32a, having in particular a first taper, intended for closing the outlet passage 8 and a second tapered portion 32b, in particular having a second taper, arranged for conveying outward the final product B in cooperation with the outlet passage 8. More precisely, the first portion 32a internally abuts on and obstructs the dispensing conduit 9 and then the outlet passage 8 in the initial configuration D1 of the base wall 3.

A joining portion 37 is provided for fixing the filtering element 30 to the base wall 3 at the closing portion 32, so as to hermetically close the outlet passage 8 in the initial configuration Dl of the base wall 3.

As illustrated in detail in FIG. 16, the joining portion 37 is obtained by fixing, for example by thermal or ultrasound welding, an annular portion of the base wall 3 arranged about the outlet passage 8 and the dispensing conduit 9, with a corresponding annular portion of the external face 33a of the central portion 33 arranged about the closing portion 32.

The joining portion 37 is such as to enable an easy release of the base wall 3 from the filtering element 30—and thus the disengagement of the closing portion 32 from the outlet passage 8—when the above-mentioned base wall 3, as a result of the deformation and crushing of the casing 2 and/or of the pressure rise inside the cavity 5, arranges or deforms from the initial configuration D1 to the final configuration D2.

However, the joining portion 37 is such as to hermetically seal the cavity 5 from the outer environment, so as to preserve and insulate the initial product P for the hygiene and the preservation of the latter.

Figure 15:
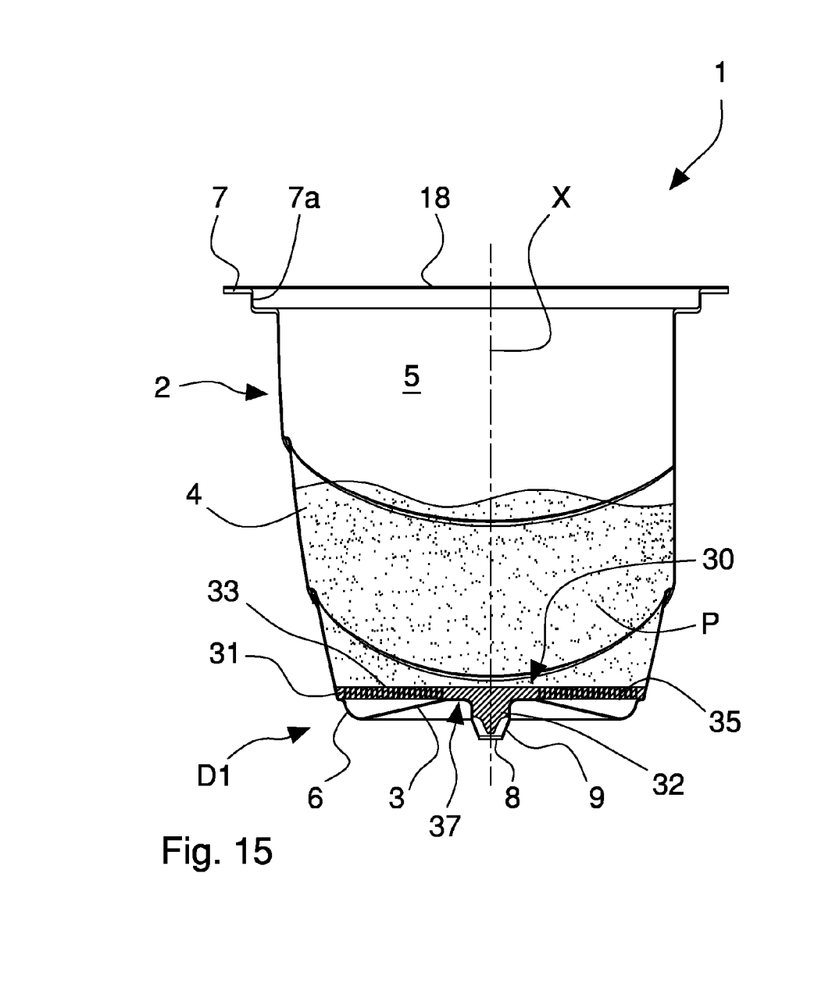
FIG. 15 is a cross-section according to the line XV-XV in FIG. 13.

The capsule 2 also includes a cover element 18 fixed to the edge 7 of the casing 2 to hermetically close the cavity 5. The cover element 18 is perforable, in particular by an injection device 61 of the dispensing machine 60 to allow the introduction of the fluid F into the cavity 5. The cover element 18 includes, for example an aluminum or plastic material sheet.

The operation or use of the capsule 1 of the invention, which can be used in a dispensing machine 60 of the type illustrated in FIG. 19 and briefly described herein below provides, in an initial step, the introduction of the fluid F into the cavity 5 through the injection device 61 of the dispensing machine 60, which has perforated the cover element 18, so that the above-mentioned fluid F can interact with the initial product P for gradually forming the final product B, typically a beverage. The injection device 61 further allows the outflow of the air contained in the cavity 5 during the introduction of the fluid. In this step, the base wall 3 is configured in the initial configuration D1 and the closing portion 32 of the filtering element 32 is engaged with and closes the outlet passage 8, thus preventing the outflow of the initial product P and/or of the final product B.

Once the final product B has been obtained, after a preset time and/or a preset amount of fluid F introduced, the capsule 1 can be progressively compressed and crushed along the direction A. The side wall 4 collapses along the pliability lines 17, and at the same time the base wall 3, following the deformation of the casing 2 and/or the pressure rise inside the cavity 5, deforms and bends towards the outside, i.e., everts, in the final configuration D2 in which it acquires a concave shape so as to allow the opening of the outlet passage 8. The joining portion 37 in this step is separated.

As illustrated in detail in FIG. 17, in such a final configuration D2 of the base wall 3, the closing portion 32 of the filtering element 30 does not engage the outlet passage 8, allowing the outlet flow of the final product B. The outward bending of the base wall causes the outlet passage 8 to be distanced apart from the closing portion 32.

It is worth noticing that, in this step the second conical shaped portion 32b of the closing portion 32 directs and conveys the product flow towards the convergent and conical terminal portion 9a of the dispensing conduit 9. In such a manner, an even outlet flow from the capsule is ensured, which is free from spurts, splashes, and gushes.

The gradual and progressive outflow of the final product B from the capsule 1 (therefore, without spurts, splashes, and gushes) is also ensured by the gradual opening of the outlet passage 8, since the base wall 3 does not pass from the initial configuration to the final configuration D2 in a sudden or abrupt manner, but in a gradual manner as the pressure inside the cavity 5 rises and/or the deformation of the side wall 4 increases.

An advantage of the capsule 1 that is the subject of the present invention is to dispense a final product, for example a beverage or another fluid food product, directly into a use container (cup, glass, etc.) without the need to be perforated below. In fact, the controlled deformation of the base wall 3, from the initial configuration D1 to the final configuration D2, and the presence of the filtering element 30 enable the automatic and gradual opening of the outlet passage 8 during the compression or crushing of the capsule 1.

The filtering element 30 prevents the outflow of the initial product P in the case that this is a percolable product or an infusion product.

The capsule 1 of the invention can therefore be used on a dispensing machine 60 that is not provided with a dispensing circuit, since such a capsule does not require an extraction device suitable for perforating the bottom thereof to allow the outflow of the beverage, nor a conduit for conveying the beverage to the container used by an individual to hold the beverage (for example, a cup, a small cup, a glass, etc.).

The absence of the dispensing circuit makes the dispensing machine more simple and inexpensive, and it further ensures the hygiene of the dispensing process and the preservation of the quality of the dispensed beverages, since contaminations between beverages dispensed in a later moment are impossible.

A further advantage of the capsule 1 is that it does not need a special sealed package, since the joining portion 37 that fixes the base wall 3 to the filtering element 30 allows hermetically closing the cavity 5 from the outer environment, thus preserving and insulating the initial product P for the hygiene and the preservation of the latter. Therefore, the capsule 1 of the invention allows reducing the manufacturing costs compared to the known capsules provided with filtering elements.

Figure 19:
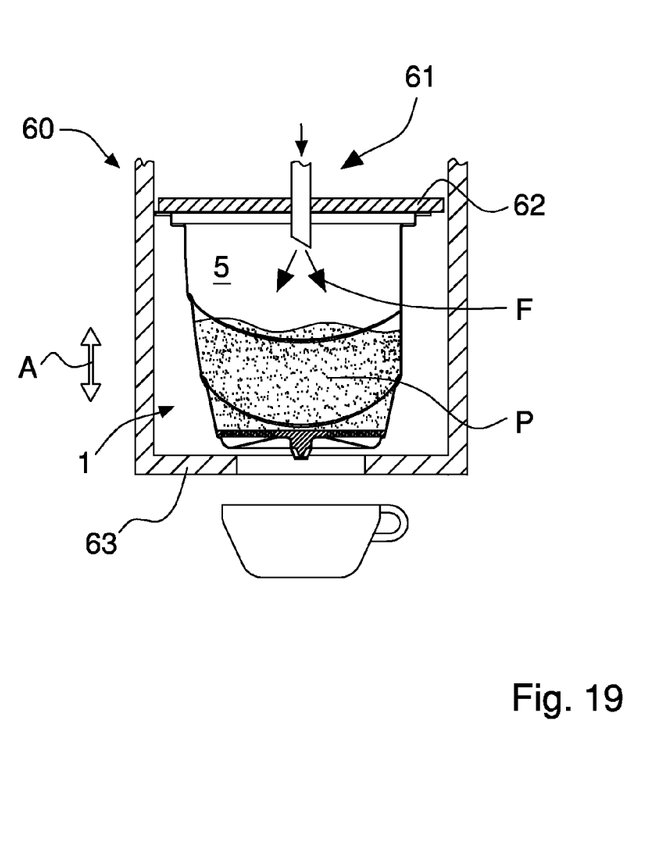
FIG. 19 is a cross-sectional view of the capsule in FIG. 13 associated with a dispensing machine.
Figure 20:
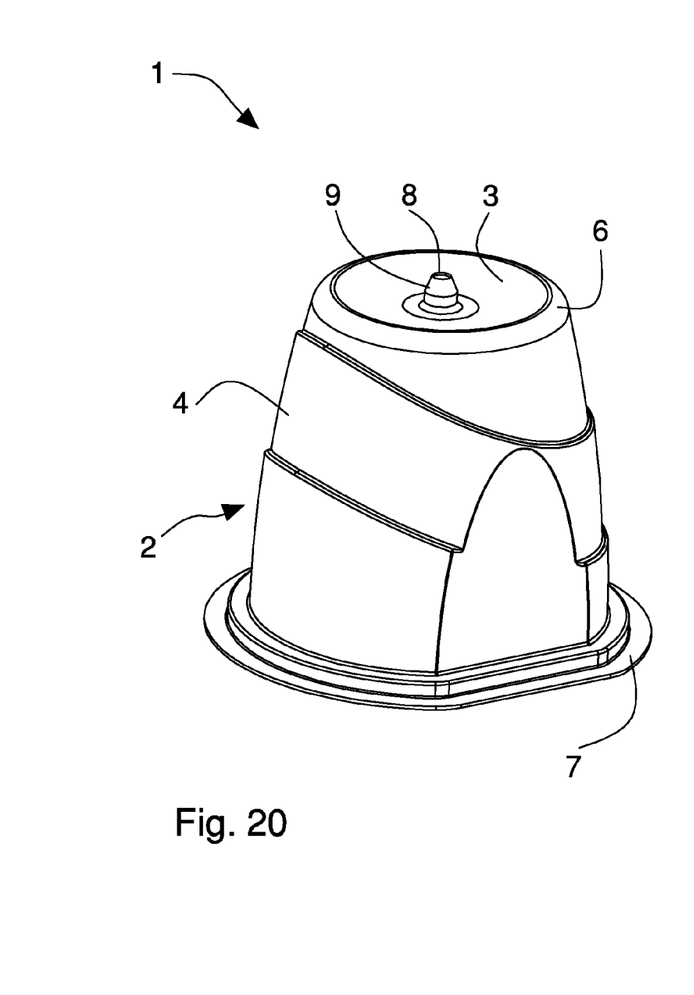
FIG. 20 is a perspective view of the capsule in FIG. 13.

With particular reference to FIG. 19, the dispensing machine 60 further includes a positioning device 63 for receiving and containing the capsule 1. The positioning device 63 is movable in both directions along the direction A, substantially vertical and orthogonal to the base wall 3.

The positioning device 63 in an initial operative position can receive capsules having different dimensions.

From the initial position, the positioning device 63 can be moved to an intermediate operative position in which the upper part of the capsule 1 provided with a cover element 18 abuts on an abutting element 62 and on the injection means 61 of the dispensing machine 60. From the intermediate operative position, the positioning device 63 can be further moved upwardly along the direction A to a final operative position for progressively compressing and crushing the capsule 1 against the abutting element 62 to allow the opening thereof and the outflow of the beverage due to the deformation of the base wall 3. The positioning device 63 is configured to support the base wall along a peripheral portion thereof adjacent to the side wall 4, thus deforming the base wall 3 from the initial configuration D1 to the final configuration D2 and permitting the outflow of the final product B into the use container.

The abutting element 62 includes a plate acting on the edge 7 of the casing 2. The plate is fixed to a frame of the dispensing machine or to the injection device 61.

Figure 21:
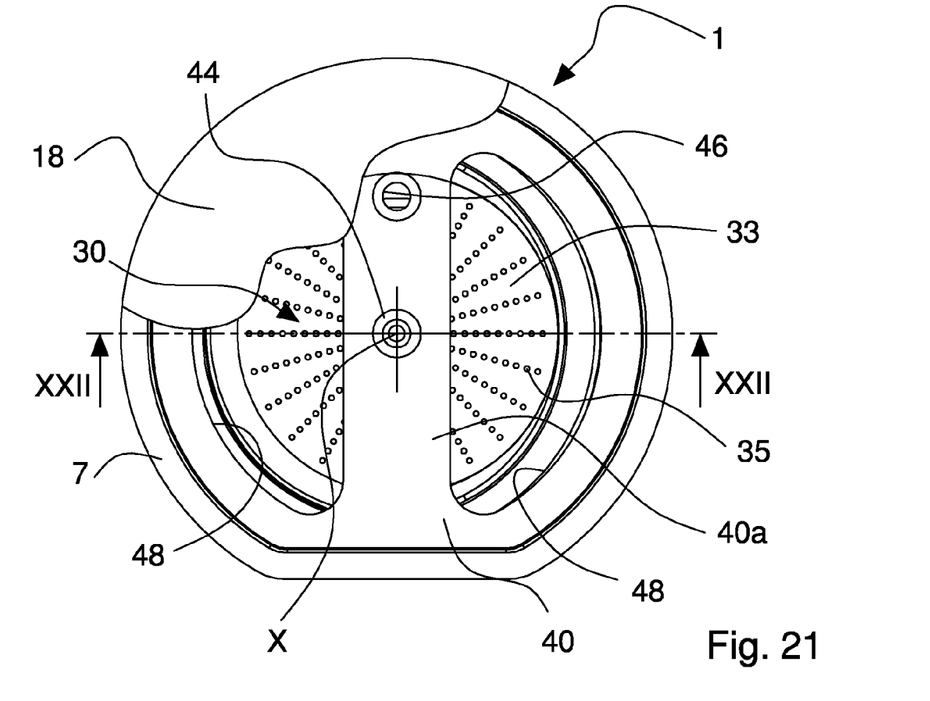
FIG. 21 is a plan view of a version of the capsule in FIG. 13 with a partially illustrated cover element.
Figure 22:
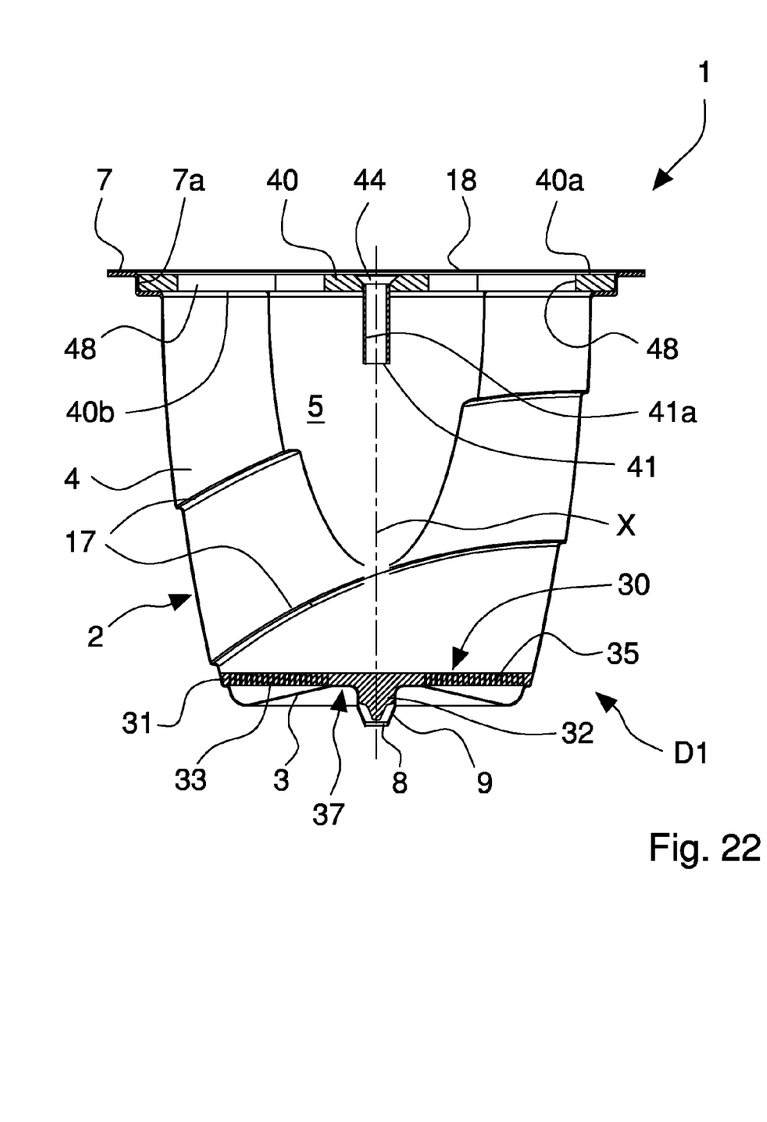
FIG. 22 is a cross-section according to the line XXII-XXII in FIG. 21.

FIGS. 21 and 22 illustrate a version of the capsule 1, that differentiates from the embodiment described above and illustrated in the FIGS. 13 to 18, in that it comprises a supporting element 40 fixed to the edge 7 of the casing 2 and facing the cavity 5 and to which at least one nozzle 41 is fixed arranged to introduce the fluid F into the cavity 5.

In particular, the edge 7 forms an annular seat 7a receiving a peripheral edge of the supporting element 40 that can be fixed thereto by welding or gluing, or by an interference fit.

The supporting element 40 comprises a body having a substantially flat shape, for example a disc, and provided with one or more respective openings 48, for example two openings, to allow the introduction of the initial product P into the cavity 5 of the capsule 1, in a introducing step of the latter.

The nozzle 41 is fixed to an internal face 40b of the supporting element 40, while on an opposite external face 40a of the latter a supplying hole 44 is provided, which is in flow communication with an internal conduit 41a of inner said nozzle 41.

At least one breather or ventilation hole 46 is provided on the supporting element 40 to allow, during the step of filling with the fluid F of the capsule 1 the necessary outflow of the air or inert gas contained therein.

The supporting element 40 and the nozzle 41 can be made in a single piece, for example by an injection molding process of a plastic material.

The supplying hole 44 of the supporting element 40 is arranged for engaging with an injection device 61 of the dispensing machine 60 (FIG. 23) including in this case a needle 71 or a similar element arranged for perforating the cover element 18 and for inserting and hermetically abutting the supplying hole 44, thus introducing the fluid F into the cavity 5 through the nozzle 41. The injection device 61 includes a further needle 72 or a similar element arranged for perforating the cover element 18 and for inserting and hermetically abutting a the breather hole 26 of the supporting element 6 so as to allow the outflow of air from the capsule 1.

Figure 23:
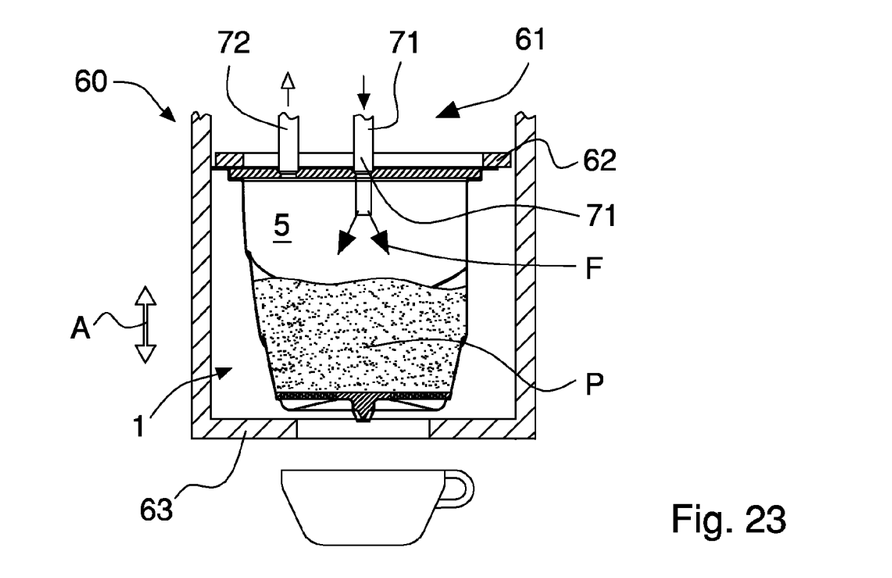
FIG. 23 is a cross-sectional view of the capsule in FIG. 21 associated with a dispensing machine.

With this version of the capsule 1, the injection device 61 of the dispensing machine 60 does not contact the initial product P, thus ensuring the hygiene of the dispensing process and the quality of the beverages at each dispensing operation, in order to preserve the organoleptic properties thereof.

The operation or use of this version of the capsule 1 of the invention is substantially identical to that of the embodiment described above.

The invention claimed is:

1. A capsule, comprising
a deformable and/or compressible casing provided with a base wall and a side wall defining a cavity for containing an initial product to be combined with a fluid to make a final product, said base wall containing an outlet passage for the outflow and dispensing of said final product, wherein when said casing is compressed, said base wall is deformed from an initial configuration to a final configuration in which said base wall bows toward an exterior of said cavity to form a substantially concave wall, and wherein said capsule includes a closing device within said cavity, substantially facing and adjacent to said base wall and provided with a closing portion that engages and closes said outlet passage in said initial configuration of said base wall in which the outlet passage is closed by the closing portion and that disengages and opens said outlet passage in said final configuration of said base wall in which the outward bending of the base wall causes the outlet passage to be released from said closing portion so as to allow the outflow and dispensing of said final product in said final configuration of said base wall.

2. A capsule according to claim 1, wherein said base wall is deformed from said initial configuration to said final configuration because of a rise of pressure within said cavity and/or a deformation of said side wall, when said casing is compressed and/or crushed.

3. A capsule according to claim 1, wherein said outlet passage is formed in a dispensing conduit of said base wall, said dispensing conduit including a substantially convergent frusto-conical terminal portion.

4. A capsule according to claim 1, and further comprising a welded joining portion for connecting said closing portion with said base wall to hermetically close said outlet passage in said initial configuration of said base wall.

5. A capsule according to claim 1, wherein said closing device comprises a lateral portion for abutting on said side wall and/or a connecting wall of said casing which is interposed between said base wall and said side wall.

6. A capsule according to claim 5, wherein said lateral portion of said closing device is welded or glued to said side wall and/or said connecting wall.

7. A capsule according to claim 1, wherein said closing portion comprises a first tapered portion for closing said outlet passage and a second tapered portion for conveying said final product outwardly in cooperation with said outlet passage.

8. A capsule according to claim 6, wherein said closing device comprises a closing element provided with a central portion interposed between said lateral portion and said closing portion and configures to abut on said base wall in said initial configuration.

9. A capsule according to claim 8, wherein said central portion comprises at least one through opening for the passage of said final product.

10. A capsule according to claim 1, wherein said closing device comprises a filtering element provided with a plurality of passages for enabling the outflow of said final product from said capsule and for preventing the outflow of said initial product from said capsule.

11. A capsule according to claim 6, wherein said closing device comprises a filtering element provided with a central portion interposed between said lateral portion and said closing portion and with a plurality of passages for enabling the outflow of said final product from said capsule and for preventing the outflow of said initial product from said capsule.

12. A capsule according to claim 1, and further comprising a cover element fixed to a first edge of said casing to hermetically close said cavity, said cover element being perforable by an injection device of a dispensing machine for delivering said fluid into said cavity.

13. A capsule according to claim 1, and further comprising a supporting element fixed to a first edge of said casing and facing said cavity, and at least one nozzle fixed to said supporting element and arranged for delivering said fluid into said cavity.

14. A capsule according to claim 13, wherein said closing device comprises a recess for receiving and locking an end portion of said nozzle.

15. A capsule according to claim 14, wherein said recess comprises an annular notch made on a central portion of said closing device.

16. A capsule according to claim 13, wherein said supporting element includes an internal face to which said nozzle is fixed, and an opposite external face provided with a supply hole connected to an internal conduit of said nozzle and engageable by an injection device of a dispensing machine suitable for dispensing said fluid.

17. A capsule according to claim 1, wherein said side wall is deformable and/or compressible along preset pliability lines to enable said casing to be compressed and/or crushed along a direction that is orthogonal to said base wall.

18. A capsule according to claim 1, wherein said casing is obtained by forming a sheet of thermoformable material and said closing element is made of an elastomeric material.

* * * * *